(12) United States Patent
Oldcorn et al.

(10) Patent No.: US 12,405,790 B2
(45) Date of Patent: Sep. 2, 2025

(54) COMPUTE UNIT SORTING FOR REDUCED DIVERGENCE

(71) Applicant: Advanced Micro Devices, Inc., Santa Clara, CA (US)

(72) Inventors: David Ronald Oldcorn, Milton Keynes (GB); Skyler Jonathon Saleh, La Jolla, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 95 days.

(21) Appl. No.: 16/457,873

(22) Filed: Jun. 28, 2019

(65) Prior Publication Data

US 2020/0409695 A1    Dec. 31, 2020

(51) Int. Cl.
| | | |
|---|---|---|
| *G06F 9/30* | (2018.01) | |
| *G06F 9/32* | (2018.01) | |
| *G06F 9/38* | (2018.01) | |
| *G06F 8/41* | (2018.01) | |

(52) U.S. Cl.
CPC ........ *G06F 9/3005* (2013.01); *G06F 9/30058* (2013.01); *G06F 9/323* (2023.08); *G06F 9/3851* (2013.01); *G06F 9/3887* (2013.01); *G06F 9/38873* (2023.08); *G06F 9/3888* (2023.08); *G06F 9/38885* (2023.08); *G06F 8/41* (2013.01)

(58) Field of Classification Search
None
See application file for complete search history.

(56) References Cited

U.S. PATENT DOCUMENTS

| | | | |
|---|---|---|---|
| 2010/0064291 A1 | 3/2010 | Aila et al. | |
| 2013/0179662 A1 | 7/2013 | Choquette et al. | |
| 2013/0326524 A1 | 12/2013 | Houston et al. | |
| 2014/0075165 A1* | 3/2014 | Chen ................. | G06F 9/322 |
| | | | 712/E9.038 |
| 2014/0149710 A1 | 5/2014 | Rogers et al. | |
| 2014/0164743 A1* | 6/2014 | Giroux .............. | G06F 9/3851 |
| | | | 712/220 |
| 2015/0095914 A1 | 4/2015 | Mei et al. | |
| 2016/0132338 A1 | 5/2016 | Jin | |

(Continued)

FOREIGN PATENT DOCUMENTS

JP    2016-532180 A    10/2016

OTHER PUBLICATIONS

Fung, W. W., Sham, I., Yuan, G., & Aamodt, T. M. (Dec. 2007). Dynamic warp formation and scheduling for efficient GPU control flow. In 40th Annual IEEE/ACM International Symposium on Microarchitecture (MICRO 2007) (pp. 407-420). IEEE. (Year: 2007).*

(Continued)

*Primary Examiner* — John M Lindlof
(74) *Attorney, Agent, or Firm* — Volpe Koenig

(57) ABSTRACT

Described herein are techniques for reducing divergence of control flow in a single-instruction-multiple-data processor. The method includes, at a point of divergent control flow, identifying control flow targets for different execution items, sorting the execution items based on the control flow targets, reorganizing the execution items based on the sorting, and executing after the point of divergent control flow, with the reorganized execution items.

14 Claims, 9 Drawing Sheets

(56) References Cited

U.S. PATENT DOCUMENTS

2016/0239302 A1    8/2016 Puthoor et al.

OTHER PUBLICATIONS

"SIMD Divergence Optimization through Intra-Warp Compaction"; Aniruddha S. Vaidya, et al.; Publication: ISCA '13: Proceedings of the 40th Annual International Symposium on Computer Architecture, Jun. 2013, pp. 368-379 [retrieved on Aug. 5, 2020] Retrieved from <URL: https://dl.acm.org.doi/abs/10.1145/2485922.2485954> pp. 369-370, 378.
Meng Jiayuan et a.: "Dynamic warp subdivision for integrated branch and memory divergence tolerance", ACM Sigarch Computer Architecture News, ACM Special Interest Group on Computer Architecture, 2 Penn Plaza, Suite 701, New York, NY 10121-0701 USA, vol. 38, No. 3, Jun. 19, 2010, pp. 235-246, XP058488253, ISSN: 0163-5964, DOI: 10.1145/1816038.1815992.

* cited by examiner

COMPUTE UNIT SORTING FOR REDUCED DIVERGENCE

BACKGROUND

Single-instruction multiple-data ("SIMD") processors achieve parallelization of execution by using a single control flow module with multiple items of data. It is possible for control flow to diverge when the control flow is dependent on the data, since different threads of execution can have different values for the data on which control flow depends. In such situations, the different control flow paths are serialized, resulting in a slowdown.

BRIEF DESCRIPTION OF THE DRAWINGS

A more detailed understanding may be had from the following description, given by way of example in conjunction with the accompanying drawings wherein.

DETAILED DESCRIPTION

Described herein are techniques for reducing divergence of control flow in a single-instruction-multiple-data processor. The method includes, at a point of divergent control flow, identifying control flow targets for different execution items, sorting the execution items based on the control flow targets, reorganizing the execution items based on the sorting, and executing after the point of divergent control flow, with the reorganized execution items.

Figure 1:
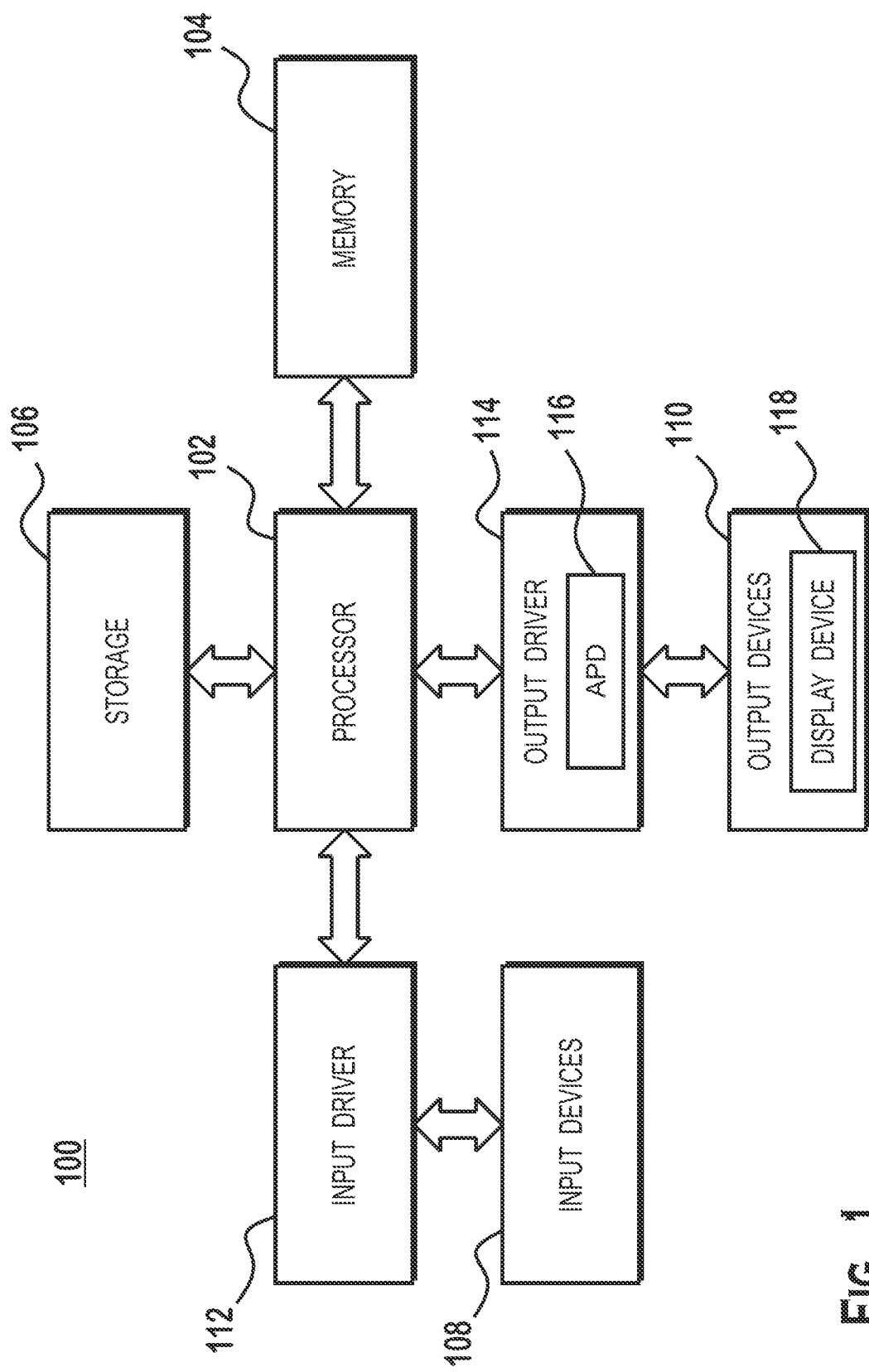
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein.

Figure 2:
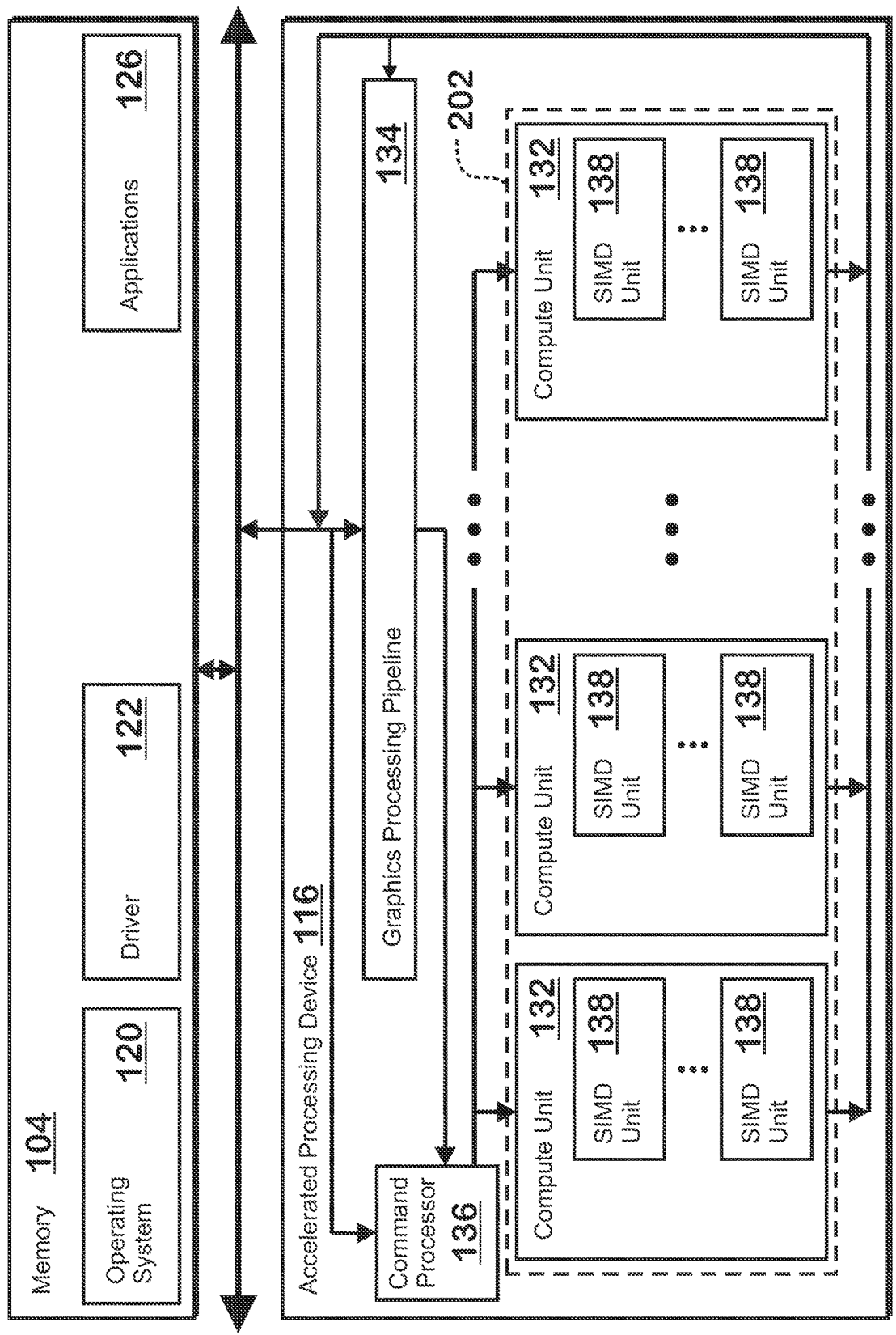
FIG. 2 is a block diagram of the device, illustrating additional details related to execution of processing tasks on the accelerated processing device, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not related, or not directly related to graphics operations, such as operations related to video, physics simulations, computational fluid dynamics, or other tasks, based on commands received from the processor 102. The APD 116 also executes compute processing operations that are related to ray tracing-based graphics rendering.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed together as a "wavefront" on a single SIMD processing unit 138. The SIMD nature of the SIMD processing unit 138 means that multiple work-items may execute in parallel simultaneously. Work-items that are executed together in this manner on a single SIMD unit are part of the same wavefront. In some implementations or modes of operation, a SIMD unit 138 executes a wavefront by executing each of the work-items of the wavefront simultaneously. In other implementations or modes of operation, a SIMD unit 138 executes different sub-sets of the work-items in a wavefront in parallel. In an example, a wavefront includes 64 work-items and the SIMD unit 138 has 16 lanes (where each lane is a unit of the hardware sized to execute a single work-item). In this example, the SIMD unit 138 executes the wavefront by executing 16 work-items simultaneously, 4 times.

One or more wavefronts are included in a "workgroup," which includes a collection of work-items designated to execute the same program. An application or other entity (a "host") requests that shader programs be executed by the accelerated processing device 116, specifying a "size" (number of work-items), and the command processor 136 generates one or more workgroups to execute that work. The number of workgroups, number of wavefronts in each workgroup, and number of work-items in each wavefront correlates to the size of work requested by the host. In some implementations, the host may specify the number of work-items in each workgroup for a particular request to perform work, and this specification dictates the number of workgroups generated by the command processor 136 to perform the work. As stated above, the command processor 136 dispatches workgroups to one or more compute units 132, which execute the appropriate number of wavefronts to complete the workgroups.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

In some implementations, the accelerated processing device 116 implements ray tracing, which is a technique that renders a 3D scene by testing for intersection between simulated light rays and objects in a scene. Much of the work involved in ray tracing is performed by programmable shader programs, executed on the SIMD units 138 in the compute units 132. Although some of the teachings presented herein are described in the context of ray tracing work being performed on the APD 116, it should be understood that various teachings presented herein may be applied in workloads other than ray tracing workloads.

Figure 3:
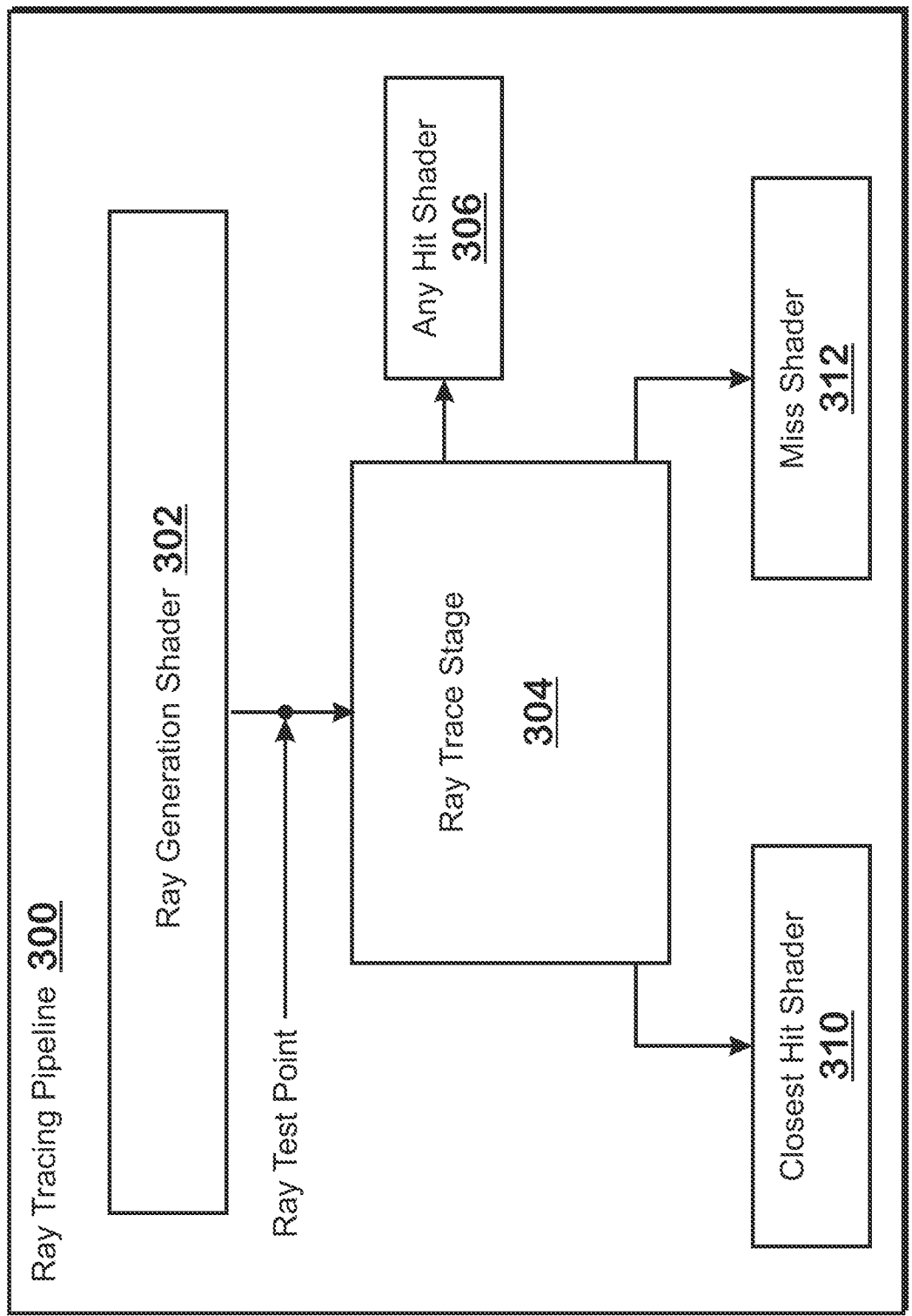
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD units 138. Any of the specific shader programs at each particular shader-implemented stage are defined by application-provided code (i.e., by code provided by an application developer that is pre-compiled by an application compiler and/or compiled by the driver 122). The ray trace stage 304 performs a ray intersection test to determine whether a ray hits a triangle. The ray trace stage 304 may be performed by a shader program executing in the SIMD units 138 or by fixed function hardware configured to perform ray intersection tests.

The various programmable shader stages (ray generation shader 302, any hit shader 306, closest hit shader 310, miss shader 312) are implemented as shader programs that execute on the SIMD units 138. The command processor 136 orchestrates execution of the ray tracing pipeline 300. Specifically, the command processor 136 is a programmable unit that executes instructions to cause the various stages of the ray tracing pipeline 300 to be performed on the APD 116. Additional details are provided elsewhere herein.

The ray tracing pipeline 300 operates in the following manner. One or more compute units 132 execute a ray generation shader 302. The ray generation shader 302 requests the ray trace stage 304 to perform one or more ray intersection tests. Each ray intersection test defines an origin and direction for a ray trace operation, which determines whether the ray hits one or more triangles or whether the ray does not hit any triangle.

The ray trace stage 304 identifies one or more triangles intersected by a ray for a ray intersection test, or, if no triangles are intersected by the ray up to a given distance, determines that the ray does not hit any triangles (i.e., that the ray "misses"). The ray trace stage 304 may be implemented in any technically feasible manner. In one example, the ray trace stage 304 is implemented as a shader program executing on one or more compute units 132. In another example, the ray trace stage 304 is implemented as fixed function hardware.

Ray trace stage 304 triggers execution of a closest hit shader 310 for the triangle closest to the origin of the ray that the ray hits, or, if no triangles were hit, triggers a miss shader. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point corresponding to a camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination (e.g., an average) of the colors determined for each of the rays of the pixel. Any particular ray generation shader 302 (or any other shader) may also specify that an any hit shader 306 is to be executed for any of the hits between a ray and a triangle, even if such hits are not the closest hit.

It is possible for the closest hit shader 310 and/or miss shader 312 to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color at the hit location to the pixel corresponding to the closest hit shader 310 that spawned the rays. It should be understood that although some examples of ways in which the various components of the ray tracing pipeline 300 can be used to render a scene have been described, any of a wide variety of techniques may alternatively be used.

It should be understood that any shader program written for the closest hit shader stage 310, miss shader stage 312, or any hit shader stage 306, may implement any of the operations described elsewhere herein as being performed by shader programs written for the ray generation stage 302. For example, in addition to spawning new rays to be provided to the ray test point for testing at the ray trace stage 304, such shader programs may specify whether misses or hits should spawn additional rays to trace (starting again at the ray test point), what shader programs to execute for any such additional rays, how to combine the color and/or luminosity values generated by such additional shader program executions, and any other operations that could be performed by a ray generation shader 302.

Shader programs are launched as "kernels" on the APD 116. A kernel specifies a particular shader program (e.g., a stitched shader program), as well as a number of work-items that will be executed as part of the kernel. The scheduler 136 breaks the kernel up into workgroups and assigns workgroups to one or more compute units 132 for execution. The workgroups of a kernel begin execution, execute their instructions, and then terminate execution. A workgroup executes as one or more wavefronts within a compute unit 132. A wavefront executes on a SIMD unit 138, as a plurality of work-items executing concurrently.

Each wavefront includes work-items that execute simultaneously in a single-instruction-multiple-data ("SIMD") manner. More specifically, the SIMD units 138 execute shader programs in a manner in which a single instruction pointer is used to control program execution for multiple work-items, and therefore multiple instructions can execute simultaneously. In an example, four work-items of a wavefront execute on a SIMD unit. Part of the execution control flow begins at a section shown in pseudo code below:

TABLE 1

Example SIMD pseudo-code begin section
add r1, r2, r3
mul r4, r1, r5
store [r6], r4

The first instruction adds the value in r2 to the value in r3 and stores the result in r1. The second instruction adds the value in r1 to r5 and stores the result in r4. The third instruction stores the value in r4 to the address specified in r6. Lanes of the wavefront executing this psuedo-code execute simultaneously, so that multiple adds, multiplies, and stores are executed simultaneously, once for each lane. "r1" through "r6" represent register names.

It is possible for control flow to diverge among lanes in a SIMD unit 138 and thus among work-items of a wavefront. More specifically, some instructions modify the instruction pointer based on the value of a particular variable. In an example, a conditional branch is an instruction whose jump target is based on the results of evaluation of a conditional. In another example, a jump may target an address specified in a variable. When control flow is divergent in this manner, the SIMD unit 138 serializes each of the possible paths that at least one lane is to execute. The following example pseudo-code illustrates a situation that can result in divergent control flow.

TABLE 2

Example SIMD divergence add r1, r2, 5
blz r1, LESS_THAN_ZERO
GREATER_THAN_ZERO:
...section 1
jmp RECONVERGE
LESS_THAN_ZERO:
...section 2
RECONVERGE:
...

In table 2, each lane executes the instruction add r1, r2, 5, which adds the value of 5 to r2 and stores the result in r1. The blz instruction is a conditional branch that branches if the value in r1 is less than zero. If the value in r1 is greater than zero, the control flow falls through to section 1, which includes some instructions and then a jump instruction to the "reconverge" label. Referring back to the conditional branch, if the value in r1 is not greater than zero, the control flow proceeds of the label LESS_THAN_ZERO, and section 2 is executed. At label "RECONVERGE," the control flow reconverges.

If a first lane executing in a wavefront had the value −10 stored in r2 when the first instruction shown were executed, then register r1 for that lane would store the value −5 after that first instruction, which would cause the first lane to execute section 2 at "LESS_THAN_ZERO." If a second lane executing in the same wavefront had the value 1 in r2 when the first instruction were executed, then the register r1 for that lane would store the value 6, which would cause that lane to not branch and execution section 1. The execution of section 1 and section 2 by different lanes would be accomplished by executing each section sequentially, with the lanes not executing a particular section switched off. More specifically, the divergence would cause SIMD unit 138 to execute section 1 for the second lane, with the first lane switched off, and then to execute section 2 for the first lane, with the second lane switched off, which reduces the efficiency of processing because multiple lanes that might otherwise execute simultaneously are now serialized.

Another example of divergent control flow is presented with respect to Table 3.

TABLE 3

Example SIMD divergence - function pointers

Trace ray to detect triangle intersection
Identify material of intersected triangle
Store address of material shader for identified material in r1
jmp [r1]
MATERIAL_SHADER_1:
...
jmp END_MATERIAL_SHADERS
MATERIAL_SHADER_2:
...
jmp END_MATERIAL_SHADERS
MATERIAL_SHADER_3:
...
jmp END_MATERIAL_SHADERS
...
END_MATERIAL_SHADERS:
...

In the example of Table 3, each lane performs a trace ray to detect a triangle intersection. Then each lane identifies the material of the intersected triangle and stores the address of the material shader for the identified material in register r1. Then each lane jumps to the address stored in r1. These addresses may be the various material shaders ("MATERIAL_SHADER_1," "MATERIAL_SHADER_2, etc.) illustrated. After executing a material shader, the lane jumps to "end_material_shaders." If each lane hit a triangle with a different material shader, then each of those material shaders would be serialized, resulting in a slowdown equal to the number of lanes in a wavefront—which would represent total deparallelization. Note, a material shader is a section of code used for ray tracing that is executed to provide a color for a ray that intersects a triangle (e.g., at the closest hit shader stage) or that misses a triangle and is thus colored by the skybox (e.g., at the miss stage).

In some examples, on a SIMD processor, the point at which a branch instruction exists is a "branch point." Branches at branch points point to one or more branch targets. Branches that have a fixed target have a single branch target and branches that have a variable target may have more than one branch target. There are also reconvergence points, which are points where lanes that have diverged due to taking different branch paths necessarily reconverge. The sequence of instructions that begins at a branch target is referred to herein as a "taken path." The sequence of instructions that begins at the instruction immediately following a conditional branch (the "not-taken point") is referred to herein as a "not-taken path." Collectively, taken paths and not-taken paths are referred to herein as "code paths." Each code path extends from a branch target or a not-taken point to a reconvergence point or a branch point. Essentially, each code path defines a sequence of instructions within which the combination of lanes that execute that code path cannot change (which change would occur due to a branch or a reconvergence).

To execute a sequence of instructions that includes a branch, the SIMD processor evaluates the branch instruction for each lane and, based on the results, sets the bit values within an execution bitmask for each code path that could be reached from the branch. Each bit in the bitmask is associated with one lane of the wavefront being executed. One bit value in the bitmask (such as "1") indicates that a corresponding lane will execute that code path. The other bit value in the bitmask (such as "0") indicates that a corresponding lane will not execute that code path.

After determining bitmasks for the different code paths, the SIMD processor advances or modifies the instruction pointer as necessary until all code paths that at least one lane is to execute have in fact been executed. For code paths whose bitmask indicates that no lanes execute that code path, the SIMD processor modifies the instruction pointer to skip that code path. In general, modifying the instruction pointer as necessary involves modifying the instruction pointer from the address of the last instruction of one code path that is executed by at least one lane to the address of another code path that is executed by at least one lane. Such modifying may include simply incrementing the instruction pointer if two code paths to be executed are laid out sequentially in memory, or may involve a "true branch," meaning that the instruction pointer is modified in a way other than simply incrementing the instruction pointer, by setting the instruction pointer to the address of the first instruction of a code path to be executed.

Figure 4:
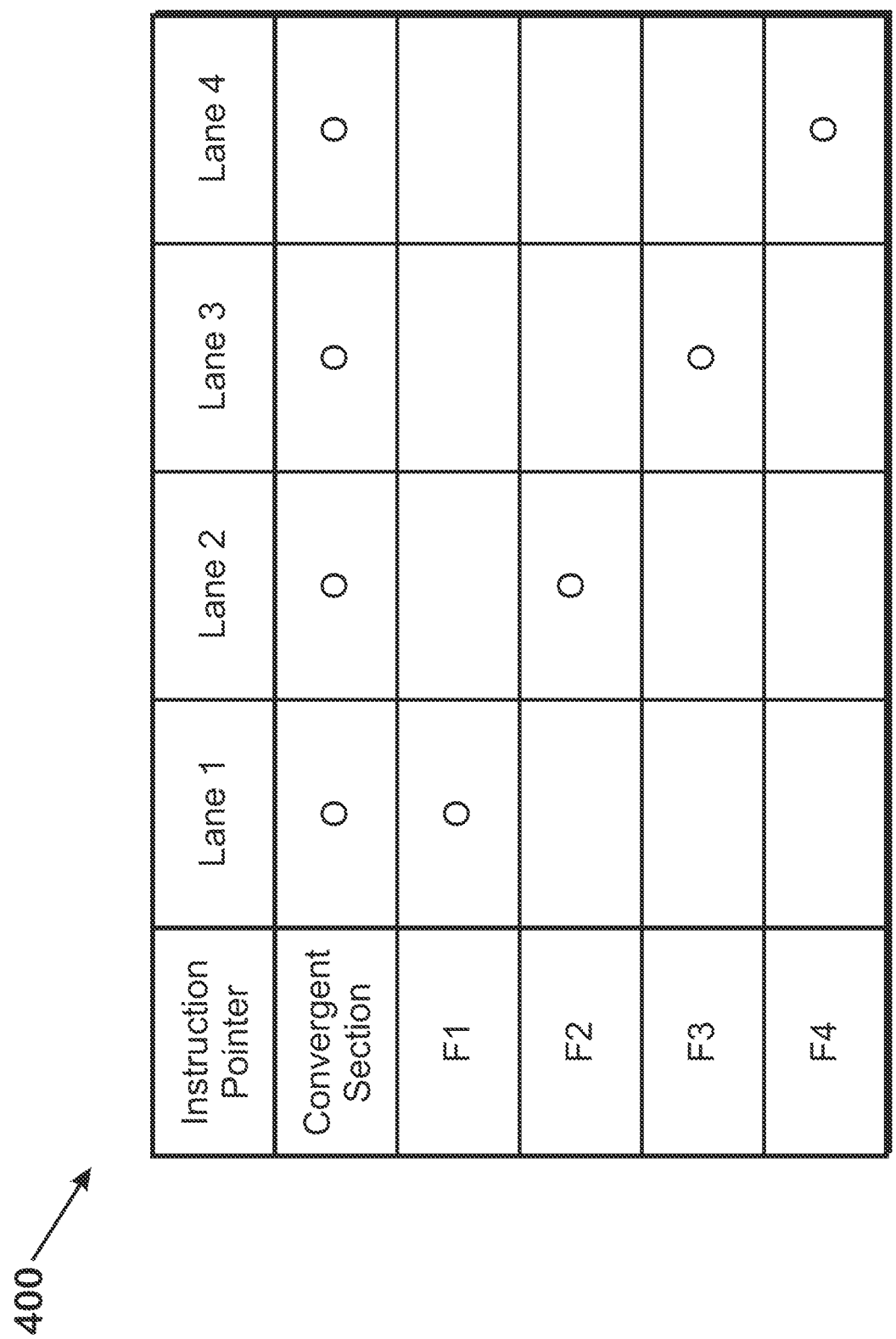
FIG. 4 illustrates serialization resulting from divergent control flow, according to an example.

FIG. 4 illustrates serialization resulting from divergent control flow, according to an example. A table 400 illustrates several sections of code, listed as "convergent section," "F1," "F2," "F3," and "F4." Time proceeds downwards in the figure. A mark "0" in a given box indicates that the lane executes the section of code in a given section of time. In the convergent section, it is assumed that each of lanes 1 through 4 execute that section together. Thus there is a mark "0" for each lane in the convergent section. Due to the results of the convergent section, it is determined that lane 1 will execute F1 and not F2, F3, or F4, that lane 2 will execute F2 and not F1, F3, or F4, that lane 3 will execute F3 and not F1, F2, or F4, and that lane 4 will execute F4 and not F1, F2, or F3. As can be seen, each of F1, F2, F3, and F4 executes in a different section of time, and thus execution of the wavefront including lanes 1 through 4 is deparallelized. More specifically, in a first section of time, lane 1 executes function F1 with lanes 2-4 switched off. In a second section of time, lane 2 executes function F2 with lanes 1 and 3-4 switched off. In a third section of time, lane 3 executes function F3, with lanes 1-2 and 4 switched off. In a fourth section of time, lane 4 executes function F4, with lanes 1-3 switched off.

To reduce control flow divergence, a compute unit 132 reorganizes execution items at a control flow divergence point. In some implementations, the term "execution item" refers to a work-item. In other implementations, the term "execution item" refers to a thread of execution that is more granular than a work-item. More specifically, it is possible to execute multiple logical threads of execution in a single work-item, by executing such multiple logical threads sequentially. In such an example, each of the multiple logical threads of execution is the execution item. Two techniques for reorganizing execution items at a divergence point include a technique in which the compute unit 132 reorganizes execution items across different wavefronts of a workgroup and a technique in which the compute unit 132 reorganizes execution items within a wavefront.

Figure 5A:
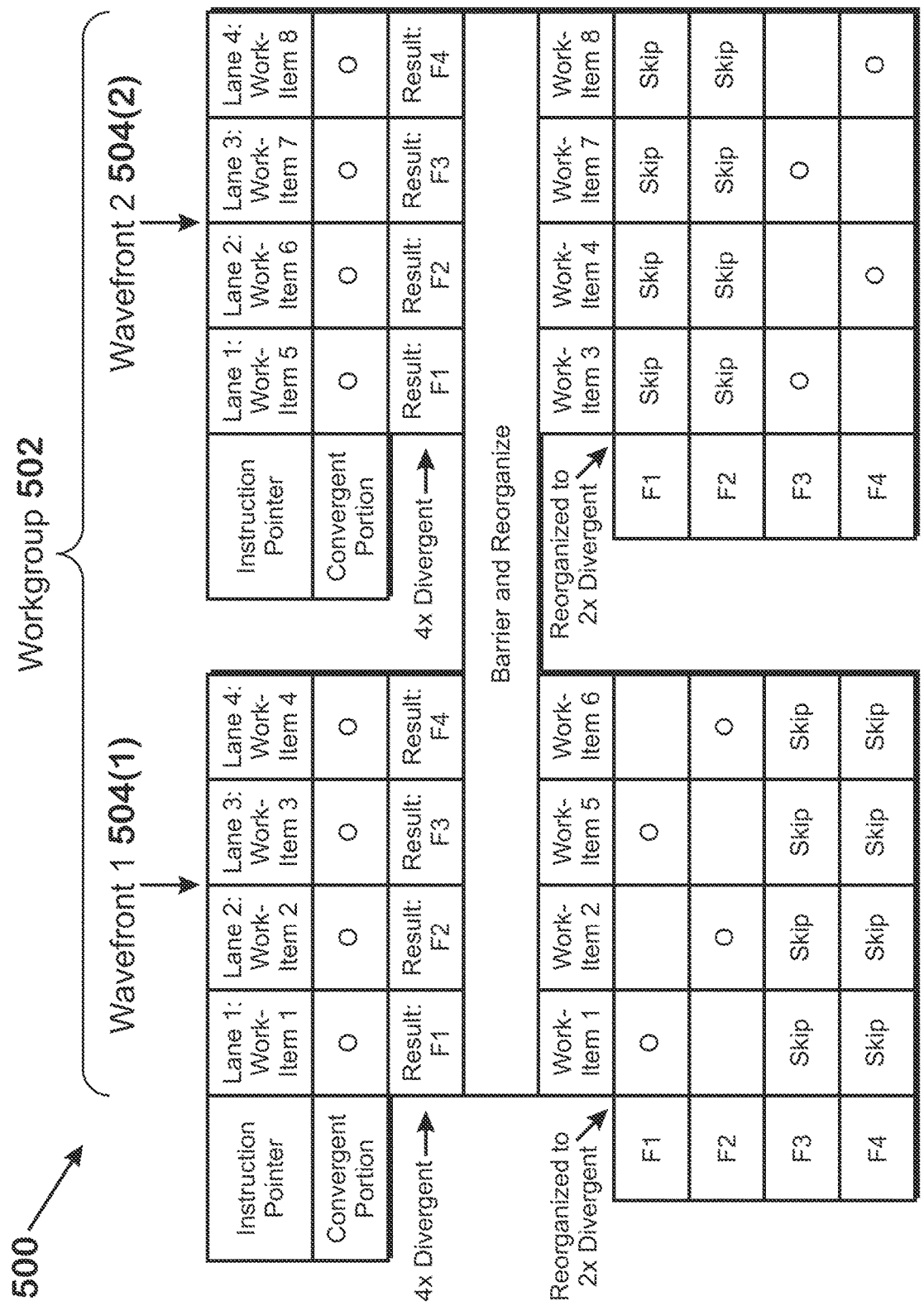
FIG. 5A illustrates a technique for reducing control flow divergence by reorganizing execution items across wavefronts of a workgroup, according to an example.

FIG. 5A illustrates a technique for reducing control flow divergence by reorganizing execution items across wavefronts of a workgroup, according to an example. In this example, there is a one-to-one correspondence between work-items and execution items—each work-item executes one execution item. In the scenario of FIG. 5A, one workgroup 502 includes two wavefronts—wavefront 1 504(1) and wavefront 2 504(2). A workgroup 502 is a collection of work-items that execute together in a single compute unit 132. Work-items of a workgroup 502 are executed together as wavefronts. Wavefronts include work-items that execute simultaneously on a SIMD unit 138 as described, for example, with respect to FIG. 4. It is possible for all of the work-items of a wavefront to execute simultaneously in a SIMD unit 138, but it is also possible for a wavefront to include a number of work-items that is greater than the number of data lanes in a SIMD unit 138. Typically, such wavefronts would include a number of work-items equal to an integer multiple of the number of data lanes in a SIMD unit 138. Execution of such wavefronts would occur by sequentially executing the sub-sets of the work-items of a wavefront. In an example, a wavefront includes 64 work-items and a SIMD unit 138 includes 16 data lanes. In this example, the wavefront is executed by executing work-items 1-16, then 17-32, then 33-48, then 49-64.

Different wavefronts of a single workgroup do not execute in the simultaneous SIMD manner described herein, although such wavefronts can execute concurrently on different SIMD units 138 of a single compute unit 132. One characteristic of a workgroup, though, is that the compute unit 132 supports synchronization among different workgroups. "Synchronization" refers to the ability for wavefronts to execute a barrier that halts execution of all wavefronts that participate in the barrier until some condition is met. Wavefronts in a workgroup also have the ability to communicate during execution via local memory in a compute unit 132.

In FIG. 5A, a table 500 illustrates execution by the workgroup 502. The workgroup 502 illustrated includes two wavefronts 504. Wavefront 1 504(1) includes work-items 1-4 and wavefront 2 504(2) includes work-items 5-8. An instruction pointer indicates the sections of code that each wavefront 504 executes at a given point of time. Time progresses forward from top to bottom. Some of the entries in the table correspond to portions of code that either may or may not be executed by particular work-items. These portions include functions F1-F4, which are executed by one or more work-items. A convergent portion is executed by all work-items of the wavefronts 504. A mark of "O" indicates that a particular work-item executes one of these portions of code and a blank rectangle indicates that a particular work-item does not execute one of these portions of code.

In the convergent portion, each work-item determines which of functions F1-F4 that work-item is to execute. Note, the term "function" refers to a portion of the shader program being executed by the workgroup 502. A barrier and reorganize stage executes after the convergent portion. The barrier and reorganize stage halts execution of each wavefront 504 until the barrier and reorganize stage has completed for each wavefront 504 for which the reorganize is occurring. These wavefronts 504 include wavefront 1 504(1) and wavefront 2 504(2) in the example of FIG. 5A. The barrier and reorganize stage reorganizes work-items across different wavefronts 504 based on the results of the convergent portion indicating which of the functions F1-F4 the work-items are to execute. In general, the goal of the reorganization is to reduce the divergence (in the example, a higher divergence is associated with a higher total number of functions to be executed) for the wavefronts by swapping work-items between wavefronts. In general, reducing divergence is accomplished by reducing the number of control flow targets in at least one wavefront.

In the example illustrated, the work-items in both wavefront 1 504(1) and wavefront 2 504(2) execute all of functions F1-F4. This is considered 4-times divergence, since the compute unit 132 executing those work-items would have to serialize each of functions F1-F4. A reorganization reduces the total number of functions to execute in the wavefronts by grouping together work-items that branch to the same control flow target. The example reorganization results in wavefront 1 504(1) having work-items designated to perform functions F1 and F2 and not F3 and F4 and wavefront 2 504(2) having work-items designated to perform functions F3 and F4 and not F1 and F2. Specifically, wavefront 1 504(1) includes work-items 1, 2, 5, and 6, each of which is designated to execute either F1 or F2, and not F3 or F4, and wavefront 2 504(2) includes work-items 3, 4, 7, and 8, each of which is designated to execute either F3 or F4, and not F1 or F2. With this reorganization, each wavefront 504 is only two-times divergent. Note that the code executed by each wavefront 504 still includes functions not performed by particular work-items, but this code is skipped, resulting in little or no execution time devoted to those functions for the wavefronts 504 having work-items that do not execute those functions.

Although a specific example sequence of instructions is shown, where this specific sequence includes determining a function to execute for each work-item, and executing the function by the work-item, it should be understood that the technique described with respect to FIG. 5A can be applied to any sequence of instructions that results in divergent control flow. In any situation, the barrier and reorganize stage would examine the total number of divergent control flow targets in a workgroup 502 and attempt to assign as few as possible to each wavefront 504. A control flow target may be identified by the instruction pointer address that is targeted by a branch instruction, by the decision of whether or not a conditional branch is taken, or through any other technically feasible means. Assigning as few as possible divergent control flow targets to each wavefront 504 can be accomplished by sorting the wavefronts based on the targets, dividing up the sorted list by the number of work-items in each wavefront 504, and assigning the divided up work-items to different wavefronts 504. Moving a work-item from one wavefront 504 to another wavefront can be accomplished in any technically feasible manner, such as by modifying lists of work-items assigned to each wavefront 504 and by copying execution state data, such as register values, flag values, and the like, from the location where the work-item was previously executing to the location where the work-item is to be moved.

The barrier and reorganize stage may be implemented completely in software, for example with instructions inserted by a runtime or offline compiler, or may be implemented with special hardware support. In an example, either or both of sorting by destination and reorganization of execution items may be accomplished by fixed-function hardware triggered by execution of a special instruction by each wavefront 504 of the workgroup 502.

Figure 5B:
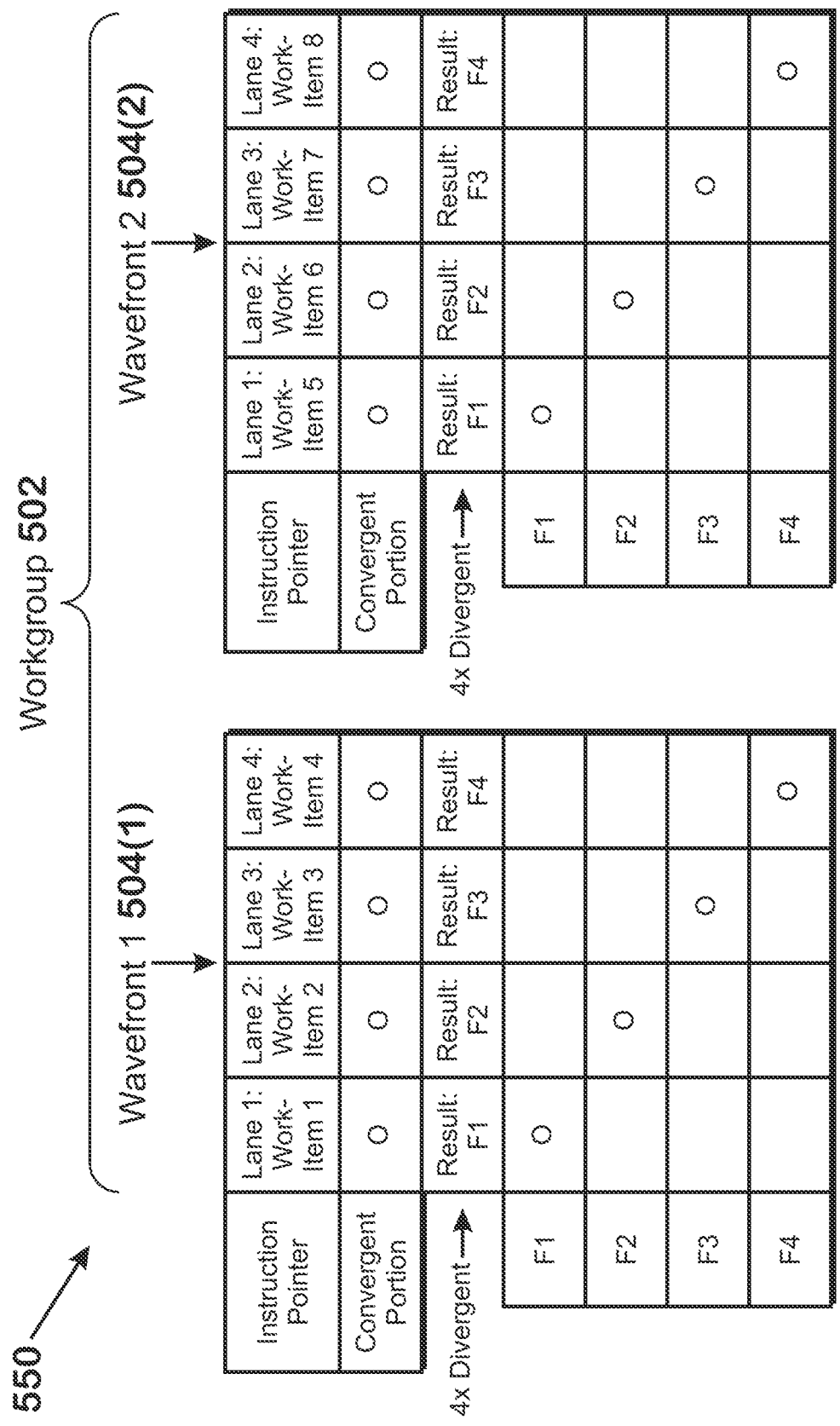
FIG. 5B illustrates control flow divergence that may occur without reorganization.

FIG. 5B illustrates execution that would occur without the reorganization illustrate in FIG. 5A. As described above, each wavefront 502 includes a work item that executes functions F1-F4. Thus, execution of these functions without the reorganization is 4× divergent, as each function is executed in turn.

Figure 6A:
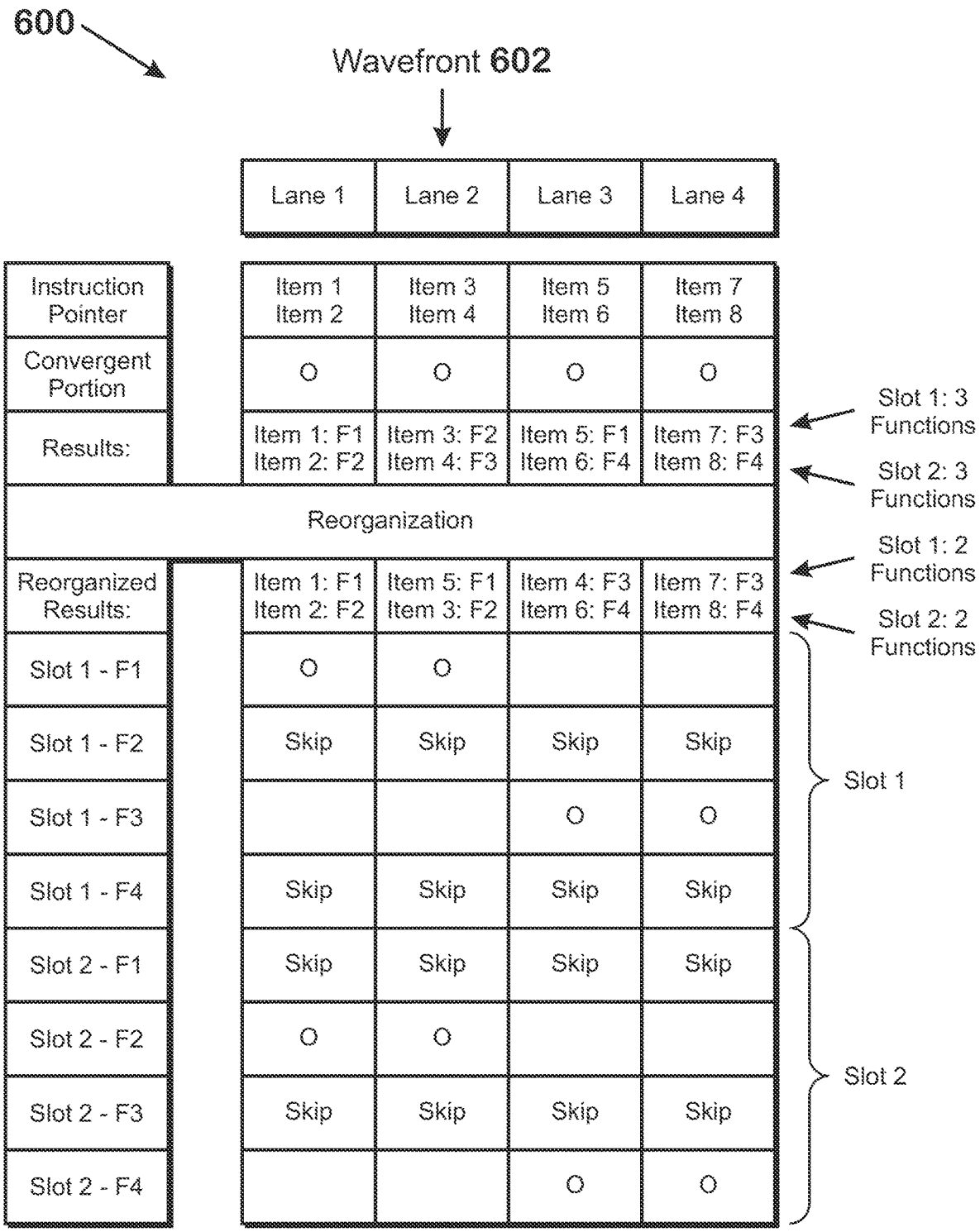
FIG. 6A illustrates a technique for reducing control flow divergence by reorganizing execution items within a wavefront, according to an example.

FIG. 6A illustrates a technique for reducing control flow divergence by reorganizing execution items within a wavefront, according to an example. In the example shown, each work-item executes two execution items. More specifically, the shader program executed by the wavefront is configured such that two instances of a particular workload—two execution items—are performed sequentially. Each execution item, executing as part of a particular work-item, is executed in a particular time slot. Note that multiple different work-items can of course execute simultaneously. Thus, multiple work-items can execute their slot 1 simultaneously, and then execute their slot 2 simultaneously. In the example of ray tracing, each slot may correspond to a different ray. In the example, a shader program determines the triangles that rays intersect. The shader program executes a material shader based on the material of the intersected triangle. Each slot for a work-item corresponds to a different ray and thus it is possible to execute a different material shader in different slots of a single work-item.

The sequential performance of two execution items allows for swapping to occur between time slots in order to reduce divergence. The example in FIG. 6A illustrates such swapping. In the example, four lanes of a wavefront 602 are executing two execution items each. Lane 1 executes execution items 1 and 2, lane 2 executes execution items 3 and 4, lane 3 executes execution items 5 and 6, and lane 4 executes execution items 7 and 8. The lanes execute the convergent portion to identify which of functions F1, F2, F3, and F4 each execution item should execute. Although not shown, the convergent portion may be executed once for each execution item.

The results of the convergent portion are shown: execution item 1 is to execute function F1, execution item 2 is to execute function F2, execution item 3 is to execute function F2, execution item 4 is to execute function F3, execution item 5 is to execute function F1, execution item 6 is to execute function F4, execution item 7 is to execute function F3, execution item 8 is to execute function F4. In slot 1 there would be a total of three functions that would execute and in slot 2, there would be a total of three functions that would execute. This means that in each slot, there would be a divergence factor of 3. At the reorganization stage, the compute unit 132 reorganizes execution items among the different lanes to reduce divergence. Specifically, the reorganization stage sorts the execution items by the targets for the execution items, divides the sorted execution items, and assigns the divided, sorted execution items to the slots. In the example shown, the sorted targets are F1 (Item 1), F1 (Item 5), F2 (Item 2), F2 (Item 3), F3 (Item 4), F3 (Item 7, F4 (Item 6), and F4 (Item 8). The reorganization stage assigns the execution items executing functions F1 and F3 to slot one and assigns the execution items executing functions F2 and F4 to slot two. Slot one executes and then slot two executes, with each getting two functions—a divergence factor of 2. Specifically, the functions F1-F4 are to execute sequentially as shown. This sequence occurs twice—once for each slot. In slot one, items 1 and 5 execute function F1 simultaneously and items 4 and 7 execute function F3 simultaneously. In slot one, functions F2 and F4 are skipped because no lanes execute those functions. In slot two, items 2 and 3 execute F2 simultaneously and items 6 and 8 execute function F4 simultaneously, with functions F1 and F3 being skipped.

Although a specific example sequence of instructions is shown, in general, the intra-wavefront technique is performed as follows. A compiler generates a shader program having two or more time slots, each time slot being a duplicate of a particular work-load to be executed for a different execution item. At a point of divergent control flow, the compiler inserts reorganization code to reorganize execution items across the time slots. The reorganization code sorts the execution items by control flow destinations, into execution item groups. The reorganization code attempts to assign as few groups as possible to each time slot. This reorganization reduces the divergence in at least one time slot, thereby reducing total execution time.

The reorganization stage may be implemented by software (e.g., by instructions inserted into a shader program by a runtime or offline compiler) or with at least partial hardware support. In an example, the shader program executes a special instruction that causes fixed function hardware to reorganize execution items across time slots as described.

Note that although the functions in the time slots are shown as executing sequentially in each time slot, it is possible that each function is repeated for each time slot. In an example, time slot 1 performs function 1 and then time slot 2 performs function 1, then time slot 1 performs function 2 and time slot 2 performs function 2, and so on. The teachings herein apply to any technique for performing multiple iterations of particular sections of divergent control flow. In various examples, a runtime or offline compiler transforms a shader program so that the multiple iterations of sections of divergent control flow are executed as described.

Figure 6B:
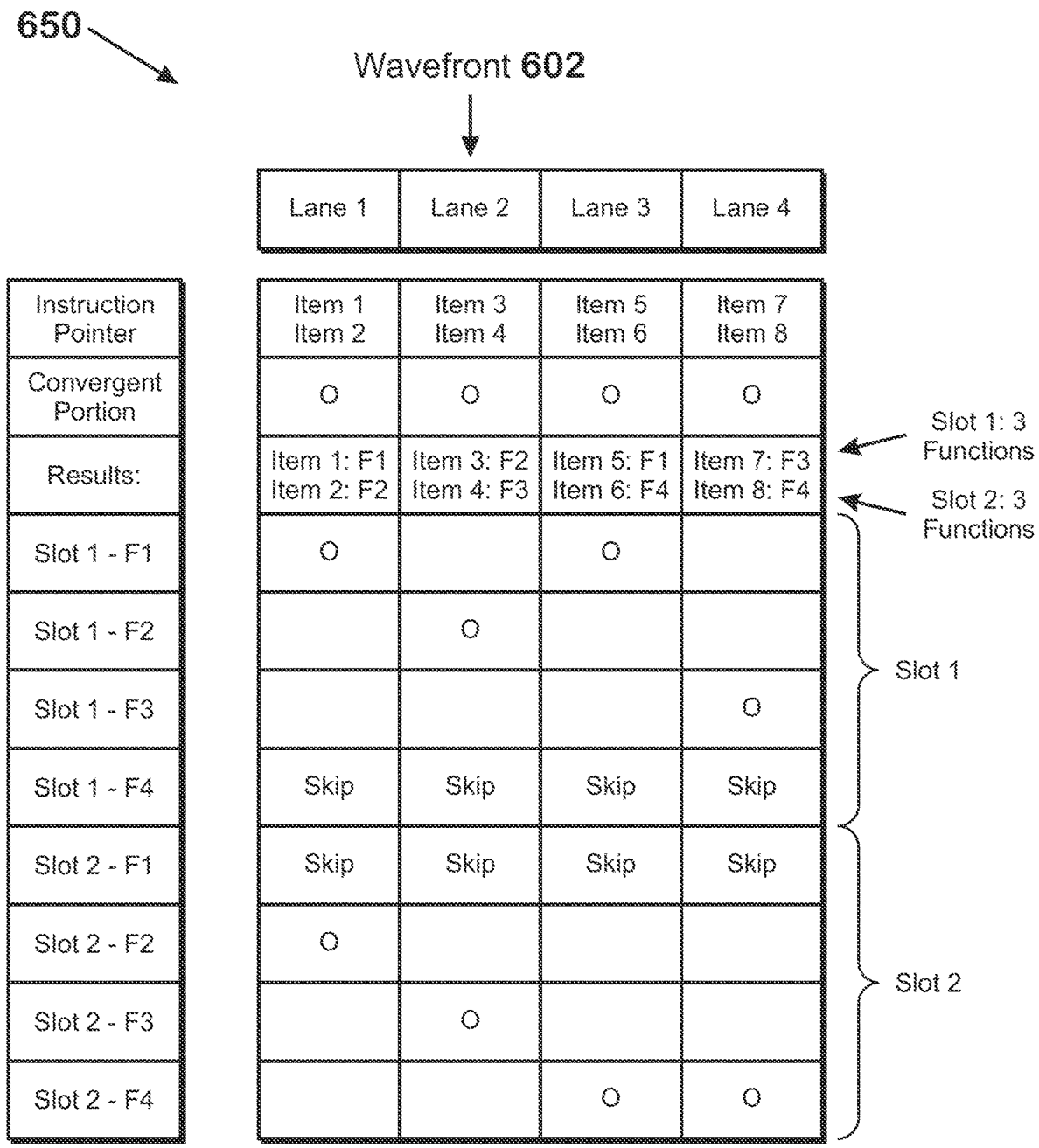
FIG. 6B illustrates control flow divergence that may occur without reorganization.

FIG. 6B illustrates execution that would occur without the reorganization of FIG. 6A. Specifically, because lanes that execute three different functions are present in each time slot, each time slot executes with 3× divergence, which is a slow-down as compared with the execution that occurs in FIG. 6A.

Figure 7:
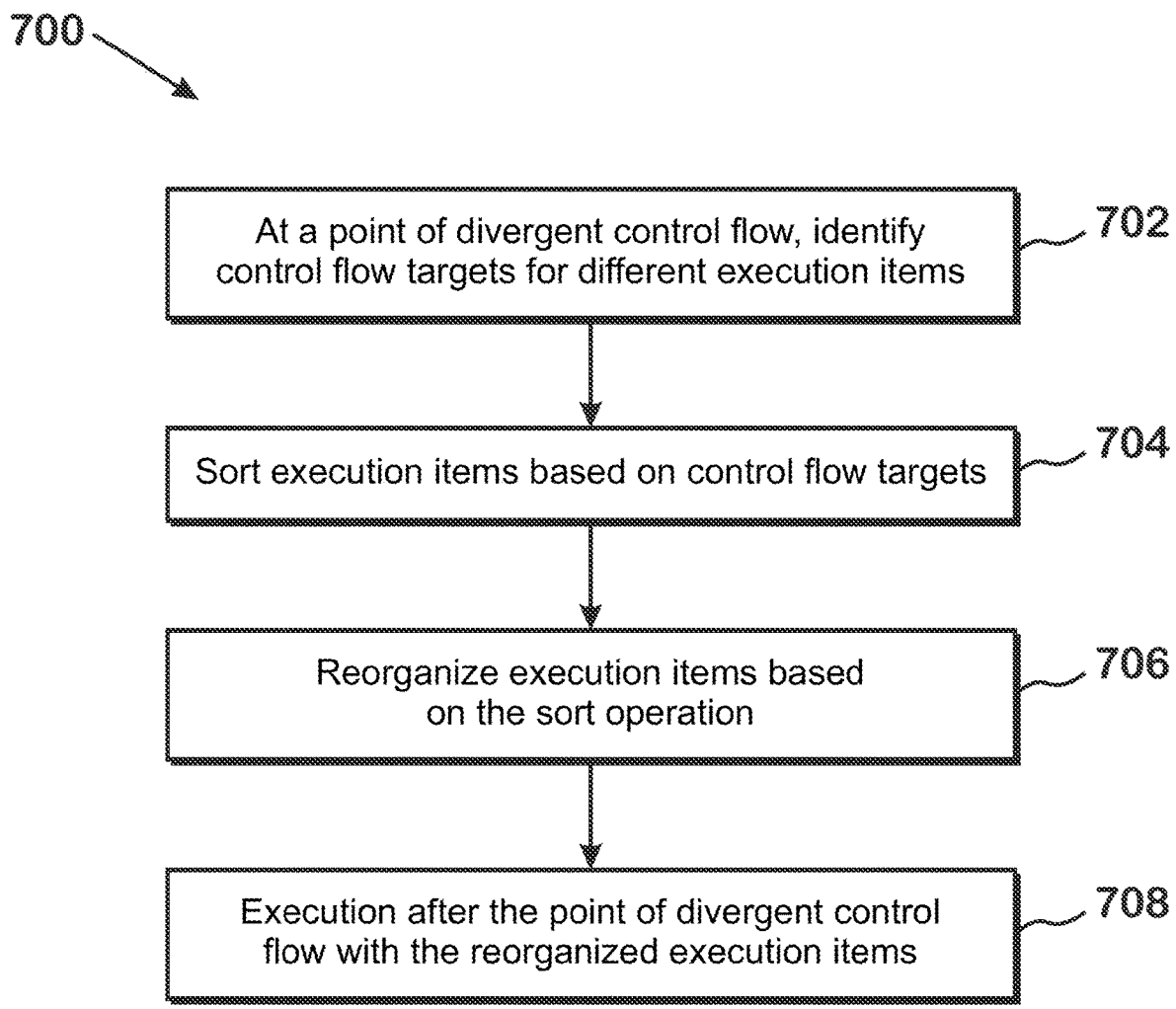
FIG. 7 is a flow diagram of a method for reorganizing execution items in an APD, according to an example.

FIG. 7 is a flow diagram of a method 700 for reorganizing execution items in an APD 116, according to an example. Although described with respect to the system of FIGS. 1-6, it should be understood that any system, configured to perform the steps of the method 700 in any technically feasible order, would fall within the scope of the present disclosure.

The method 700 begins at step 702, where a compute unit 132 identifies control flow targets for different execution items at a point of divergent control flow. As described elsewhere herein, two techniques are disclosed for reorganizing execution items. In a first technique, execution items are reorganized between time slots within a single wavefront. This first technique may be referred to herein as the "intra-wavefront technique." In a second technique, execution items are reorganized across wavefronts of a wavegroup. This second technique may be referred to herein as the "inter-wavefront technique." In either technique, the shader program that is executing reaches a point of divergent control flow, which is a point where different execution items execute different portions of the shader program due to having different branch targets (e.g., due to a different conditional result or due to a different address target for a variable target jump instruction). At step 702, these different branch targets are identified for the different execution items. In some examples, a branch target for a particular execution item includes the address of the destination for that execution item. In other examples, a branch target includes an indication of whether a conditional branch is taken or not (i.e., whether the conditional is met).

In an example, each execution item executes a trace ray operation to identify the material of a triangle intersected by a ray. At this point, different execution items have encountered different triangles with different materials and thus execute different material shaders. Note that the different material shaders are inlined into the shader program being executed, so that executing a particular material shader is accomplished by jumping to the appropriate inlined function, rather than by stopping execution of the current shader and launching the material shader. In other words, at least a part of the ray tracing pipeline is implemented by a single "monolithic" shader program that includes the shaders at different stages of the ray tracing pipeline, as well as instructions for controlling execution flow between the different stages and for moving data between the different stages.

At step 704, the compute unit 132 sorts the execution items based on the control flow targets. In an example where the divergence is based on a jump to a variable target, the control flow target is the target of the jump. In an example where the divergence is based on a conditional branch, the control flow target is the result of the condition. Sorting based on the control flow targets comprises sorting the execution items such that execution items having the same control flow targets are grouped together. The result of the sorting is data indicating the sorted order of the execution items. In an example, execution items 1 through 8 exist and execute a conditional branch. Execution items 1, 3, 4, and 7 take the branch and execution items 2, 5, 6, and 8 do not take the branch. The data indicating the sorted order indicate that execution items 1, 3, 4, and 7 are in a first group and that execution items 2, 5, 6, and 8 are in a second group.

At step 706, the compute unit 132 reorganizes the execution items based on the sort operation. In the intra-wavelength technique, where execution items are reorganized across time slots, reorganizing the execution items includes assigning each group of sorted execution items to a particular time slot. In the above example, execution items 1, 3, 4, and 7 would be assigned to a first time slot and execution items 2, 5, 6, and 8 would be assigned to a second time slot. As described elsewhere herein, a time slot is an iteration of a sequentially repeated portion of a shader program. More specifically, to enable reorganization of execution items within a wavefront, at least some portions of a shader program are configured to execute in two or two or more iterations, where each iteration corresponds to a different time slot. Because divergence is related to the number of different segments of code executed at a particular time, having multiple time slots allows reorganization of execution items between time slots so that more execution items having the same control flow target are executed in the same time slot. It is of course possible that the number of execution items in each sorted group is not the same as the number of execution items in the wavefront. Even in this scenario, however, where two or more groups are assigned to a particular time slot, the sorting reduces divergence, which reduces total execution time.

In some implementations, a compiler introduces the time slot construct into a shader program. One example of a compiler is a runtime compiler that executes, for example as part of the driver 122. Another example of a compiler is an offline compiler that executes as part of an application compiler that compiles the application that triggers execution of the shader program. The compiler introduces the time slot construct by causing at least a portion of a shader program to execute for two or more iterations—one iteration for each time slot. In each iteration, a different execution item executes the portion of the shader program. In addition, because the purpose of the time slots is to allow reduction of control flow divergence that results from different execution items taking different control flow paths, each iteration is able to select any of the possible divergent paths (even though each execution item may only take one such path). In an example, if there are four different segments of code that could be executed in a given portion of the shader program, with a variable jump targeting one of the possible segments of code, then in each time slot, an execution item could execute any of the possible segments of code. Divergent control flow can still happen within a given time slot, and this is implemented by a SIMD unit 138 serializing each of the different possible control flow paths, as is normal for divergent control flow.

In the inter-wavefront technique, the reorganization of execution items occurs across wavefronts. More specifically, the sorting data described above is still used to group execution items. However, instead of reorganizing the execution items across time slots in a single wavefront, the groups are assigned together to particular wavefronts. In the above example, where each wavefront has a width of four work-items, execution items 1, 3, 4, and 7 would be assigned to a first wavefront and execution items 2, 5, 6, and 8 would be assigned to a second wavefront. As with the intra-wavefront technique, multiple groups may be assigned to each wavefront, but divergence would still be reduced. At step 708, the shader program executes past the point of divergent control flow, with the reorganized execution items.

It should be understood that many variations are possible based on the disclosure herein. Although features and elements are described above in particular combinations, each feature or element can be used alone without the other features and elements or in various combinations with or without other features and elements. In one example, although the techniques have been described in the context of SIMD processors, the techniques may also be used for multiple-instruction-multiple-data ("MIMD") processors. In another example, although sorting is stated as being done based on the code section to be executed, it is alternatively possible to sort based on other criteria such as the texture that a lane is to fetch or the direction of the ray associated with the lane. Sorting based on such criteria is not directly related to sorting based on what code sections will be executed by the lanes. However, such sorting would be more likely to cause lanes having similar execution flow to be grouped together. In an example, it is somewhat likely that lanes having a similar ray direction will hit the same triangles and will thus execute the same material shader. It is also somewhat likely that lanes that fetch the same texture will execute a similar sequence of instructions because fetching the same texture may indicate that the lanes execute the same shaders (e.g., material shaders).

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, the ray tracing pipeline 300, the ray generation shader 302, the ray trace stage 304, the any hit shader 306, the miss shader 312, or the closest hit shader 310) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for reducing divergence of control flow in a single-instruction-multiple-data processor, the method comprising:
    at a point of divergent control flow, identifying control flow targets for different execution items of a wavefront having a plurality of time slots;
    sorting the execution items based on the identified control flow targets, to generate sorted execution item groups;
    reorganizing the execution items of the wavefront across the time slots based on the sorted execution item groups such that within a time slot of the time slots more execution items have the same control flow target than without the reorganizing; and
    executing the wavefront after the point of divergent control flow.

2. The method of claim 1, wherein identifying the control flow targets for the different execution items comprises identifying whether the different execution items take or do not take a branch.

3. The method of claim 1, wherein identifying the control flow targets for the different execution items comprises identifying a target address of a jump.

4. The method of claim 1, wherein sorting the execution items comprises grouping execution items with the same control flow target together into the execution item groups.

5. The method of claim 1, further comprising:
    adding, by a compiler, into a shader program, instructions to implement the sorting and reorganizing.

6. A device for reducing divergence of control flow in a single-instruction-multiple-data ("SIMD") processor, the device comprising:
    a memory configured to store a shader program; and
    the SIMD processor, configured to execute the shader program with multiple execution items, and to:
        at a point of divergent control flow, identify control flow targets for different execution items of the multiple execution items of a wavefront having a plurality of time slots;
        sort the execution items based on the identified control flow targets, to generate sorted execution item groups;
        reorganize the execution items of the wavefront across the time slots based on the sorted execution item groups such that within a time slot of the time slots more execution items have the same control flow target than without the reorganizing; and
        execute the wavefront after the point of divergent control flow.

7. The device of claim 6, wherein identifying the control flow targets for the different execution items comprises identifying whether the different execution items take or do not take a branch.

8. The device of claim 6, wherein identifying the control flow targets for the different execution items comprises identifying a target address of a jump.

9. The device of claim 6, wherein sorting the execution items comprises grouping execution items with the same control flow target together into the execution item groups.

10. A non-transitory computer-readable medium storing instructions that, when executed by a processor, cause the processor to reduce divergence of control flow in a single-instruction-multiple-data ("SIMD") processor, by performing operations including:
    at a point of divergent control flow, identifying control flow targets for different execution items of a wavefront having a plurality of time slots;
    sorting the execution items based on the identified control flow targets, to generate sorted execution item groups;
    reorganizing the execution items of the wavefront across the time slots based on the sorted execution item groups such that within a time slot of the time slots more execution items have the same control flow target than without the reorganizing; and
    executing the wavefront after the point of divergent control flow.

11. The non-transitory computer-readable medium of claim 10, wherein identifying the control flow targets for the different execution items comprises identifying whether the different execution items take or do not take a branch.

12. The non-transitory computer-readable medium of claim 10, wherein identifying the control flow targets for the different execution items comprises identifying a target address of a jump.

13. The non-transitory computer-readable medium of claim 10, wherein sorting the execution items comprises grouping execution items with the same control flow target together into the execution item groups.

14. The non-transitory computer-readable medium of claim 10, wherein the operations further comprise:
    adding, by a compiler, into a shader program, instructions to implement the sorting and reorganizing.

* * * * *